United States Patent [19]

Castaldi et al.

[11] Patent Number: 5,199,840
[45] Date of Patent: Apr. 6, 1993

[54] AUTOMATED STORAGE AND RETRIEVAL SYSTEM

[76] Inventors: John Castaldi, 785 Carroll St., Brooklyn, N.Y. 11215; Fred Greenzang, 14 High Pasture Cir., Dix Hills, N.Y. 11746

[21] Appl. No.: 561,112

[22] Filed: Aug. 1, 1990

[51] Int. Cl.⁵ .............................................. B65G 1/04
[52] U.S. Cl. ..................................... 414/280; 414/273; 414/786; 414/661; 198/728; 198/717; 198/469.1; 198/487.1
[58] Field of Search ............... 414/273, 222, 277, 786, 414/278, 280, 281, 283, 285, 286, 661, 331; 198/728, 729, 487.1, 732, 722, 717, 469.1; 364/478

[56] References Cited

U.S. PATENT DOCUMENTS

| | | |
|---|---|---|
| 2,707,666 | 5/1955 | Becker . |
| 3,490,616 | 1/1970 | Castaldi . |
| 3,547,282 | 12/1970 | Hartbauer et al. . |
| 3,809,259 | 5/1974 | Pipes . |
| 3,860,130 | 1/1975 | Frangos . |
| 3,883,008 | 5/1975 | Castaldi . |
| 3,968,888 | 7/1976 | Van Vliet . |
| 4,010,855 | 3/1977 | Smith . |
| 4,116,324 | 9/1988 | Burmeister . |
| 4,240,540 | 12/1980 | Hobbs et al. . |
| 4,352,622 | 10/1982 | Wieschel . |
| 4,358,239 | 11/1982 | Dechanstreiter . |
| 4,361,411 | 11/1982 | DiLiddo . |
| 4,382,741 | 5/1983 | Lunardi . |
| 4,556,355 | 12/1985 | Glater . |
| 4,561,820 | 12/1985 | Matheny, III et al. . |
| 4,625,857 | 12/1986 | Kuehl . |
| 4,639,187 | 1/1987 | Maruyama et al. . |
| 4,656,949 | 4/1987 | Ragot . |
| 4,674,948 | 6/1987 | Hornacek . |
| 4,690,602 | 9/1987 | Castaldi et al. . |
| 4,734,005 | 3/1988 | Blumberg . |
| 4,756,657 | 7/1988 | Kinney ....................... 414/280 X |
| 4,773,807 | 9/1988 | Kroll et al. . |
| 4,812,102 | 3/1989 | Smith et al. ................ 414/280 |
| 4,856,956 | 8/1989 | Zur . |
| 4,964,776 | 10/1990 | Wakita et al. . |
| 4,967,130 | 10/1990 | Sorenson et al. . |
| 4,969,791 | 11/1990 | Stolzer . |
| 4,984,106 | 1/1991 | Herger et al. . |
| 4,984,108 | 1/1991 | Grant et al. . |
| 4,998,858 | 3/1991 | Magens . |

FOREIGN PATENT DOCUMENTS

| | | | |
|---|---|---|---|
| 2545010 | 4/1977 | Fed. Rep. of Germany | 414/280 |
| 981129 | 12/1982 | U.S.S.R. . | |
| 1175810 | 8/1985 | U.S.S.R. .................... | 414/280 |
| 1051879 | 12/1966 | United Kingdom . | |
| 2153801 | 8/1985 | United Kingdom . | |

*Primary Examiner*—Frank E. Werner

[57] ABSTRACT

An automated storage and retrieval system includes two confrontingly opposed, columnar arrays which define a plurality of vertically spaced tray-receiving recesses. A platform is vertically displaceable along and between the arrays and carries an extraction device operable for withdrawing a selected tray from an array recess onto the platform, and for inserting a tray supported on the platform into a vacant recess in either array. The extraction device includes a pair of rods carried on and for movement longitudinally along the platform, toward and away from the opposed arrays, about opposed continuous-loop drive belts which lie in substantially vertical planes. The rods are releasably engageable, through rotation of the drive belts, within handles provided at and extending longitudinally outwardly from the opposite ends of each tray to enable withdrawal and insertion of the selected tray.

16 Claims, 6 Drawing Sheets

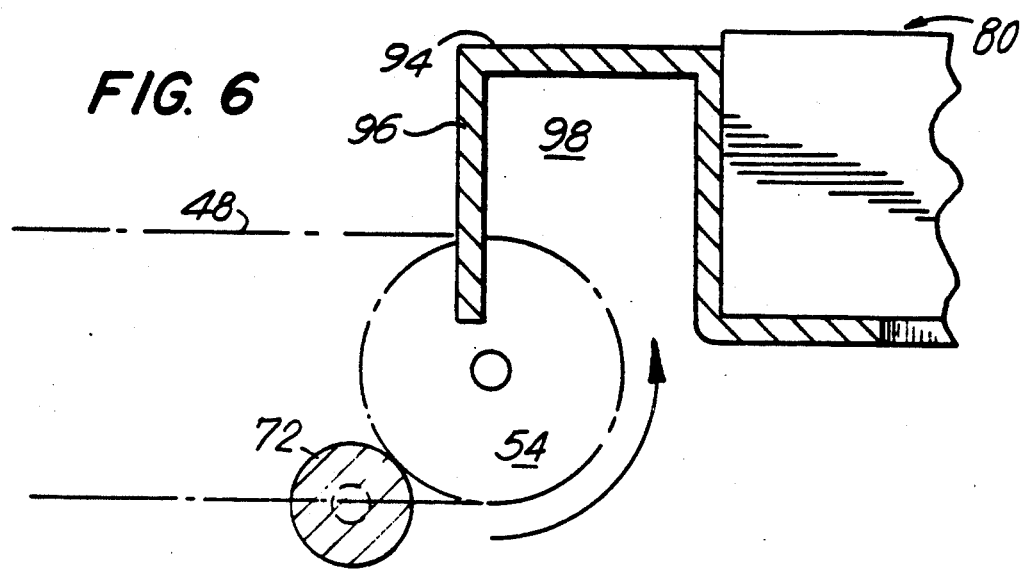
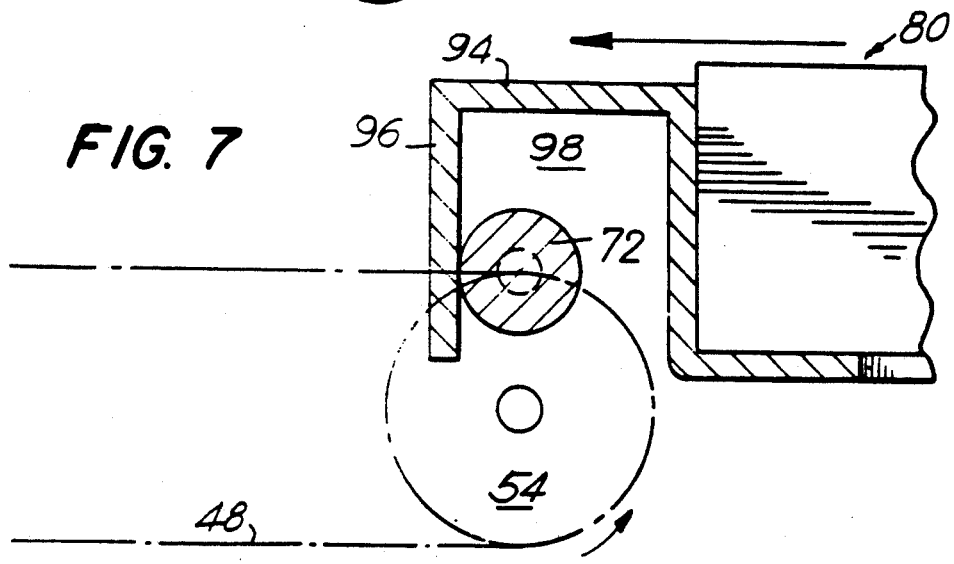
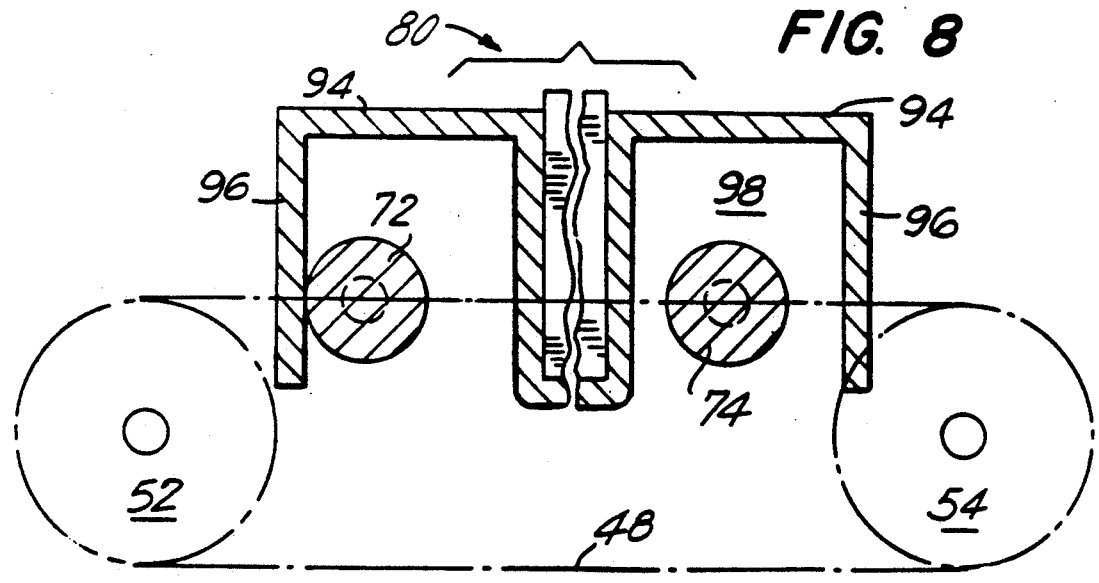

AUTOMATED STORAGE AND RETRIEVAL SYSTEM

FIELD OF THE INVENTION

The present invention relates to automated article storage and retrieval systems wherein articles are stored in bins or trays located within and along arrays of such trays. The invention is more particularly directed to such a system wherein the trays, which are vertically spaced within recesses defined along a pair of confrontingly opposed columnar arrays separated by an access region within which a platform is vertically displaceable into registration with array-supported trays or tray positions, may be selectively withdrawn from and inserted into the arrays by a novel extraction device carried on the movable platform.

BACKGROUND OF THE INVENTION

Automated storage and retrieval systems for providing high density yet readily accessible storage of articles have long been known. Commonly-owned U.S. Pat. No. 4,690,602, for example, discloses a two-dimensional array of storage bins or locations which are extractable for accessing stored articles. To achieve such access a two-dimensionally displaceable platform is movable to selected storage locations thereof and arm-like extractor elements are extendible into the storage location past the front edge of a bin for engagement with the bin sides to withdraw the bin from the array and, similarly, to reinsert the bin into the same or a different storage location.

The prior art teaches a variety of arrangements for effecting extraction and return of an array-supported storage bin or tray. Some require highly specialized or complex structural elements and assemblies that are unnecessarily subject to breakdowns or which typically require regular realignment and/or repair. Others operatively grip or grasp or otherwise engage the bins in a fashion that is somewhat less reliable or stable or secure than desired or that does not permit the apparatus to extract bins containing unusually heavy articles.

SUMMARY OF THE INVENTION

The present invention provides an automated storage and retrieval system in which articles are storable in outwardly slidable trays that are supported in vertically-stacked relation along a pair of confrontingly-opposed, columnar arrays. A platform carries an extraction device for withdrawing and reinserting trays in the arrays and which is single-dimensionally displaceable vertically along and between the opposed arrays into registration with selected trays or tray-receiving array locations. The extraction device is formed of a pair of continuous loop drive chains spaced from each other widthwise across the platform and lying in substantially vertical planes. The chains carry spanningly therebetween a first and a second rod spaced along and jointly moveable with the chains into releasable engagement within the interior channels of handles that extend longitudinally at or from the tray ends to thereby grasp the tray and enable selected tray withdrawal from and reinsertion into a location in either of the opposed arrays.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several views:

FIGS. 6 to 8 are diagrammatic side views illustrating, for purposes of explanation, the progressive withdrawal of a tray from an array location by operation of the extraction device of the invention.

DETAILED DESCRIPTION OF THE PREFERRED EMBODIMENT

The present invention relates to an automated article storage and retrieval system and, in a currently preferred form of the invention, to a vertically-oriented, optionally self-contained arrangement in which a platform is vertically displaceable along and between a pair of confrontingly opposed or facing arrays or towers or columns in each of which a plurality of vertically-spaced tray locations are defined. The invention is particularly directed to a novel and advantageously-configured extraction device operable for withdrawing any selected tray from its location in one of the arrays, for transporting—in association with a movable platform—the withdrawn tray to a selected vacant tray location in either array and for then inserting the tray into the selected vacant location.

Figure 1:
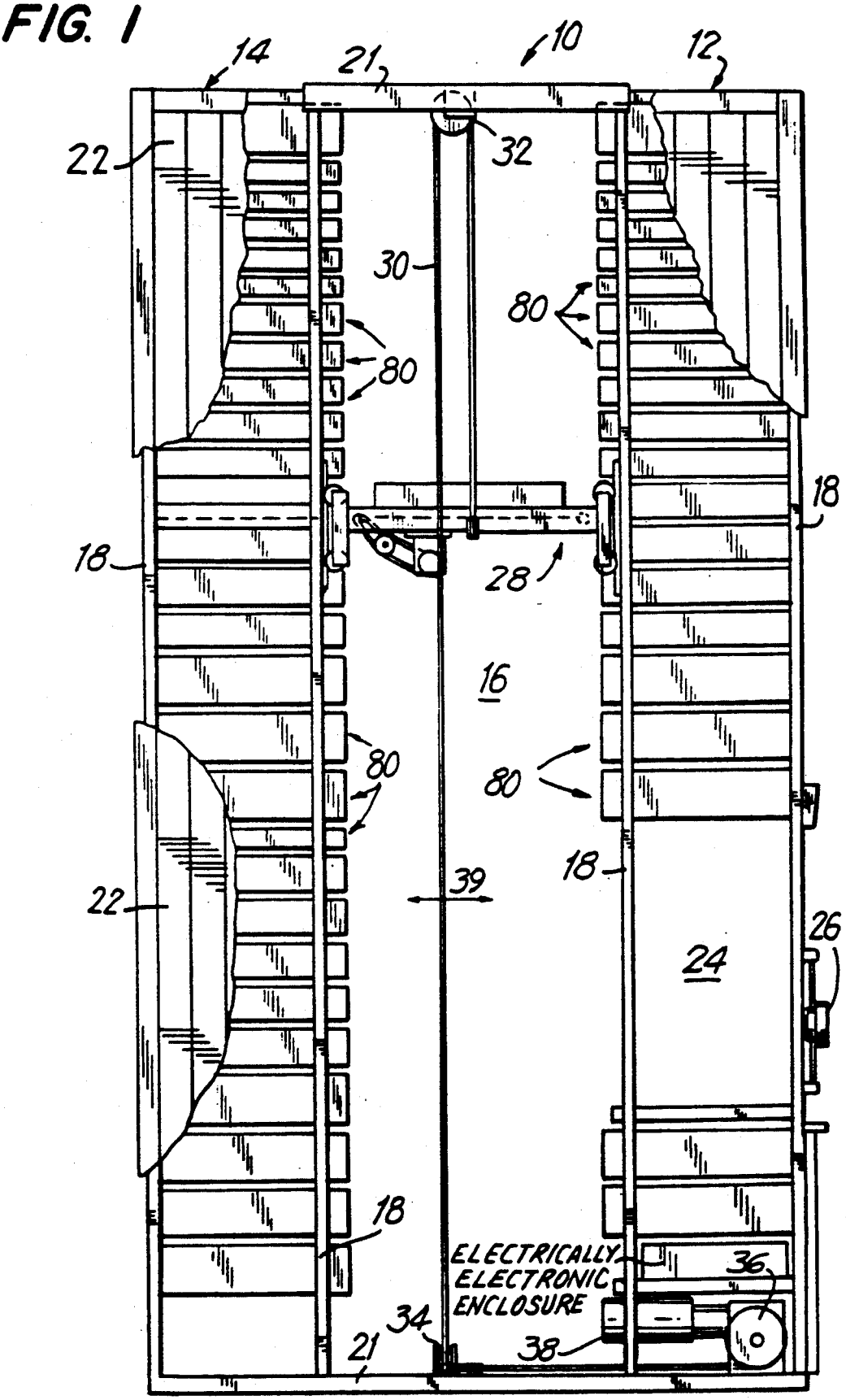
FIG. 1 is a side view, partly in cross section, of an automated storage and retrieval system constructed in accordance with the present invention.
Figure 2:
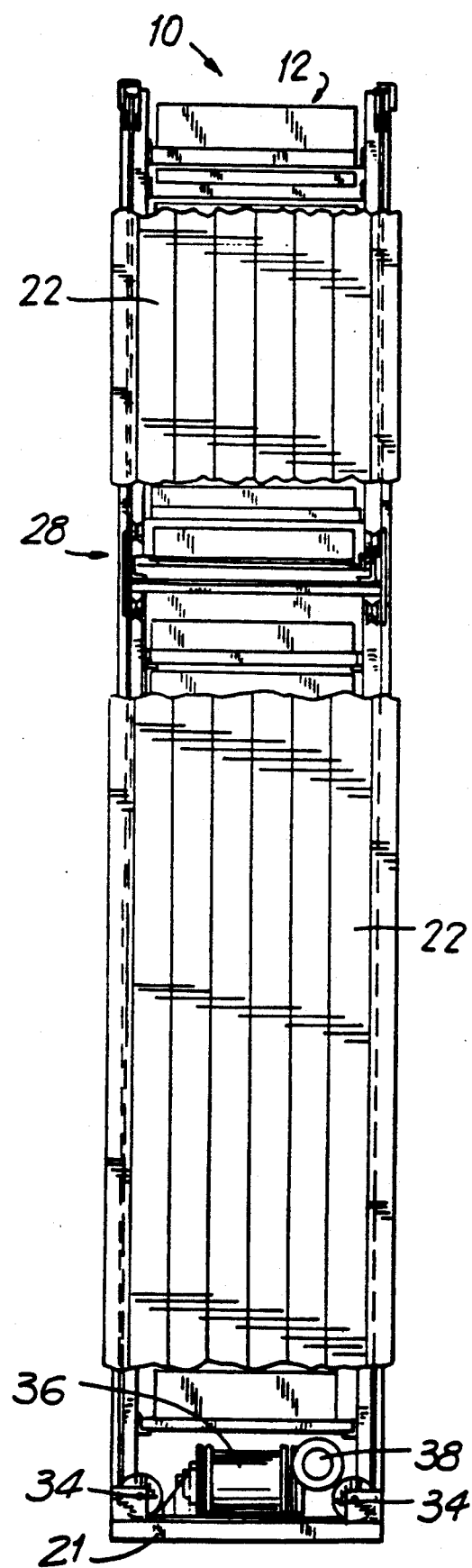
FIG. 2 is an end view, partly in cross section, of the automated storage and retrieval system shown in FIG. 1.

With specific reference to the drawings, an overall view of an automated storage and retrieval system constructed in accordance with the invention is shown in FIGS. 1 and 2 and there identified by the general reference numeral 10. The system 10 is comprised of first and second vertically-oriented and, if desired, substantially freestanding columnar arrays 12, 14 disposed in opposed or facing relation and spaced apart by a predetermined distance or separation to delineate an access region 16 therebetween. Each array 12, 14 may, by way of example, be fabricated as a framework of vertical masts or standards 18 and generally horizontal crossbars 20, the crossbars defining a plurality of tray-receiving locations or recesses or shelves in each array as will hereinafter be described. Top and bottom bracing members 21 may also spanningly connect the opposed arrays 12, 14 for enhanced stability. In a preferred form of the system 10 the absolute and relative vertical positions of the crossbars or shelf members 20 are adjustable for selectively varying the locations of and vertical spacing between all or particular ones of the tray-receiving locations. The system 10 may also be suitably enclosed or enveloped by an outer skin or sheeting 22 so as to limit unintended access to articles stored therewithin and to prevent inadvertent worker injury from moving parts. As is typical in automated storage and retrieval systems, an operator workstation or article delivery area 24 implemented as an enlarged opening in the rear face of one of the arrays—e.g. the first array 12—and a corresponding vertical separation between appropriately positioned horizontal crossbars or shelf members 20 at the top and bottom of the workstation may also be provided. A keyboard 26 or the like mounted adjacent the workstation 24 enables direct user input to and control of the operation of the system 10.

Figure 4:
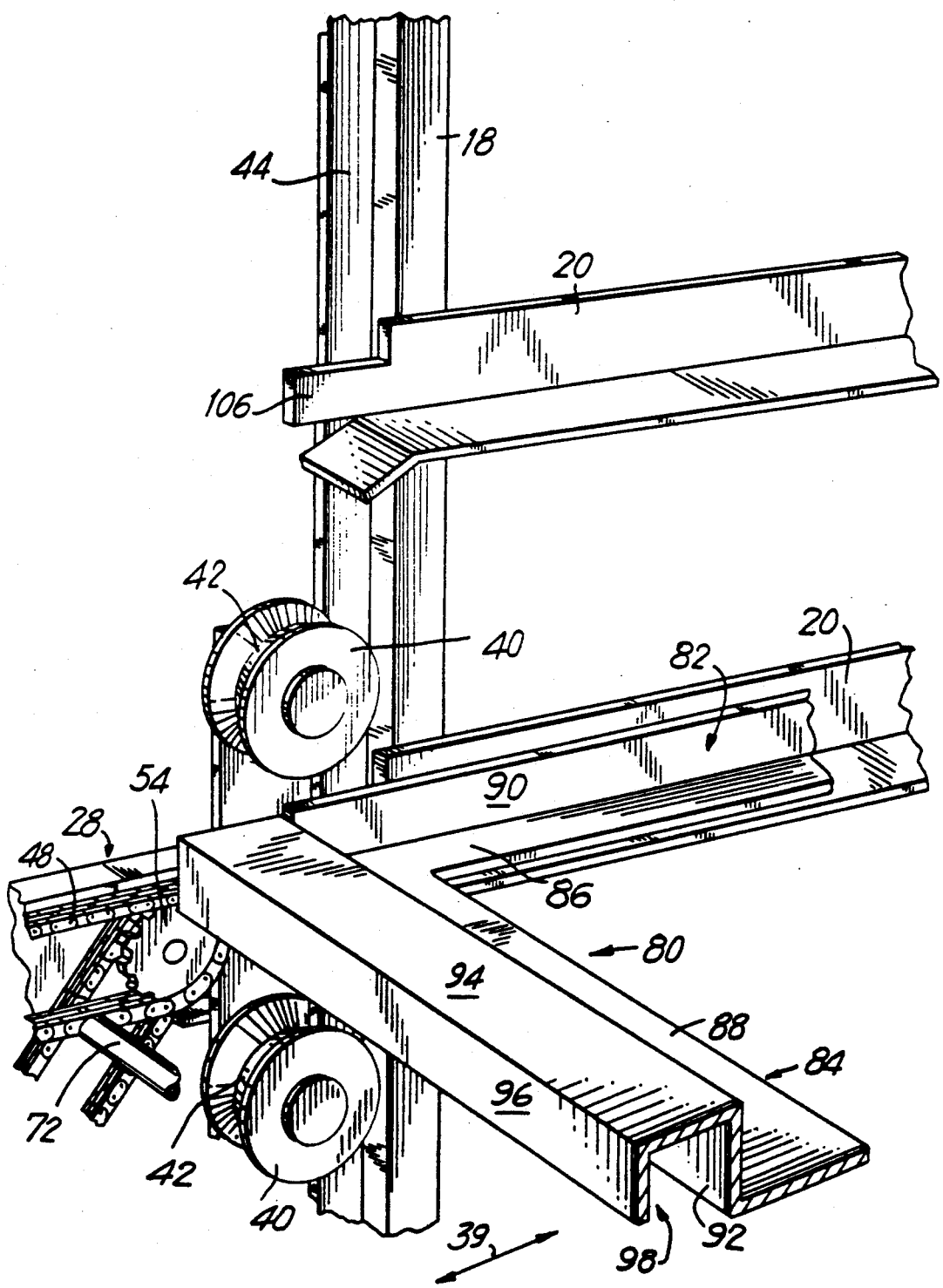
FIG. 4 is an elevated perspective view, partly broken away, of a portion of the platform and of one of the arrays including several tray-receiving shelves disposed vertically therealong.

The trays 80 which are receivable in the horizontal crossbar-defining locations or shelves of each array 12, 14 may be fabricated as bins for direct receipt of stored parts or articles—for which purpose the trays may be compartmentalized or otherwise selectively capable of such compartmentalization or segmentation—or as carriers for replaceable or reconfigurable inserts within which such parts or articles are carried as is well known in the art. In the embodiment of the invention herein described, by way of example, each tray 80 comprises a generally rectangular, centrally-open frame within which an article bin is supportedly carryable and made up of unitarily formed or otherwise rigidly attached side members 82 and end members 84 (FIG. 4). Each of the side and end members 82, 84 is configured, as with an L-shaped cross section, to provide a respective bin-supporting horizontal base 86, 88 and an upstanding respective sidewall 90 or endwall 92. When a tray 80 is disposed within one of the available array locations or recesses, the undersides of its opposed side member bases 86 rest atop the crossbars or shelf members 20 and thereby support the tray within that recess and as the tray is slidably withdrawn or extracted therefrom.

Depending longitudinally-outwardly from each endwall 92 of the tray 80 is a ledge 94 and, depending downwardly from the free end of the ledge, is a leg or lip 96. Together, the endwall 92, ledge 94 and lip 96 form, at or proximate each longitudinal end of the tray, a handle-like arrangement including a substantially U-shaped interior channel 98 that is open at its bottom or downwardly-oriented side and which extends along the width of the tray 80. Although the channel 98, ledge 94 and lip 96 are illustrated herein as extending for substantially the entire tray width, those skilled in the art will readily appreciate as this description proceeds that the extent of such widthwise extension is generally a matter of design choice, as is the U-shaped cross-sectional contour of the channel 98 and, too, the exact structure of the tray-carried member(s) by which the channel is defined. Similarly, a modification in which the channel 98 is open upwardly—rather than downwardly—is both contemplated and intended as being within the scope of the invention.

A platform, generally designated 28, is adapted for single-dimensional vertical movement along and between the opposed first and second arrays 12, 14 within the access region 16. For this purpose, a lift cable 30 is secured to the platform 28 and is led, as through top and bottom-mounted pulleys 32, 34, to a feed drum 36 about which the lift cable is selectively wound and unwound for respectively raising and lowering the platform. The feed drum is, in turn, rotated by and under the control of an electric, bidirectionally-operable motor 38 located, in the illustrated embodiment, at or proximate the bottom of the first array 12. The drum 36 may also include or carry an encoder (not shown) of any suitable form for use in sensing the rotation of the feed drum and, thereby, determining the resulting anticipated vertical displacement of the platform 28.

Figure 3:
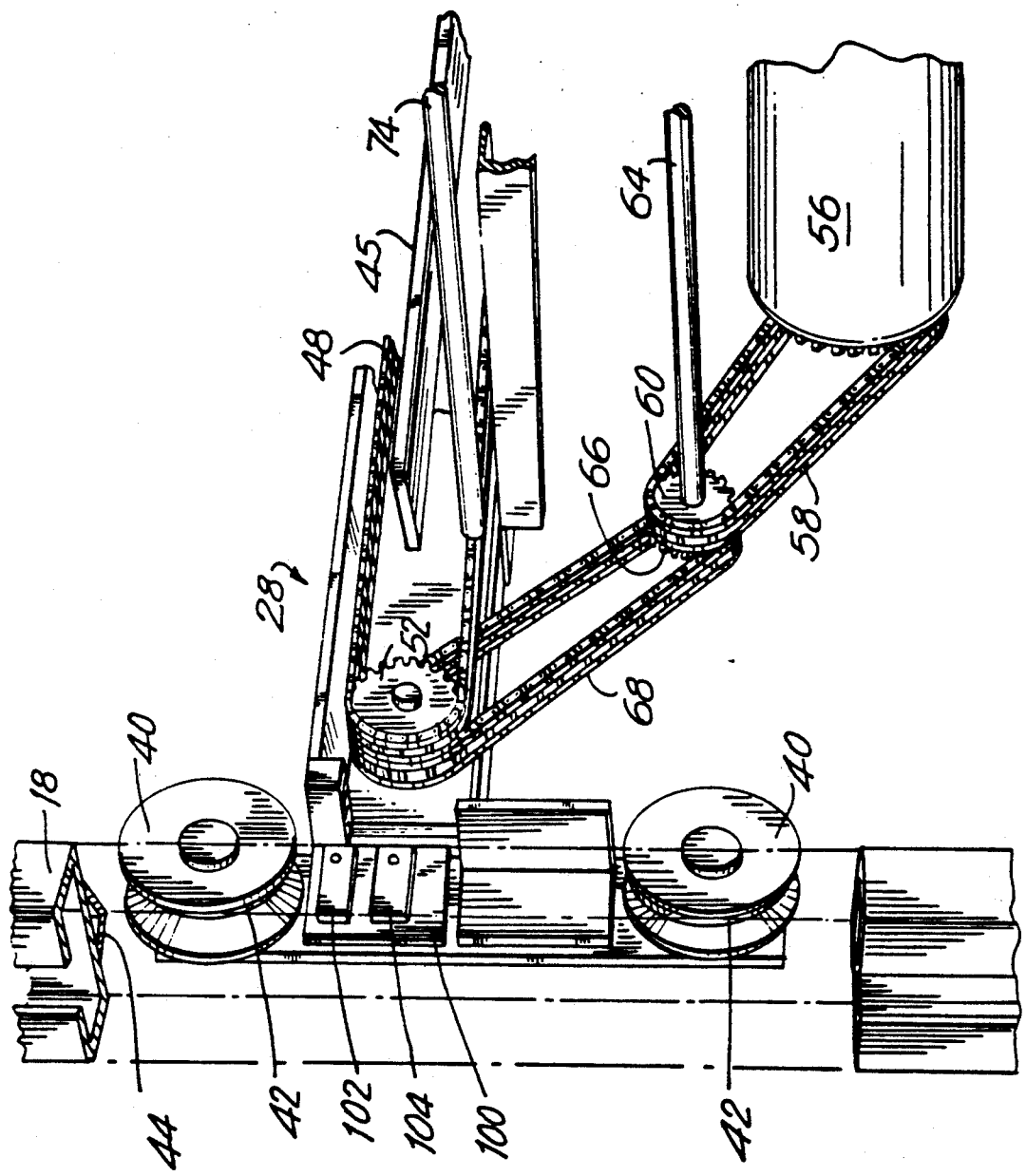
FIG. 3 is a perspective view, partly broken away and exploded, of a portion of the vertically-displaceable platform and of one of the vertical standards along which the platform rides.

The platform 28 may be configured in any appropriate manner such, for example, as the generally open frame construction of the presently-disclosed embodiment. The length of the platform—i.e. along the opposed tray-extraction and insertion directions extending between the opposed arrays 12, 14 as indicated by the double-headed arrow 39 in FIGS. 1 and 5— substantially conforms to the width of the access region 16 and the platform carries, at each of its longitudinal ends, vertically-oriented pairs of guide rollers or castors 40 in continuous engagement with the interior standards 18 that bound the access region 16. More particularly, V-shaped troughs 42 defined in the circumferential faces of the rollers 40 mate with wedge-like surfaces 44 provided on the interior standards 18 (FIGS. 3 and 4) along which the guide rollers ride as the platform 28 is vertically displaced and are effective to maintain the engagement of the rollers and vertical standards and prevent unintended horizontal shifting or translation of the platform during, for example, its vertical displacement. The platform frame may be further provided with side-mounted, longitudinally extending tray-support shoulders 45 onto which trays 80 extracted from the arrays 12, 14 are slidably receivable.

Figure 5:
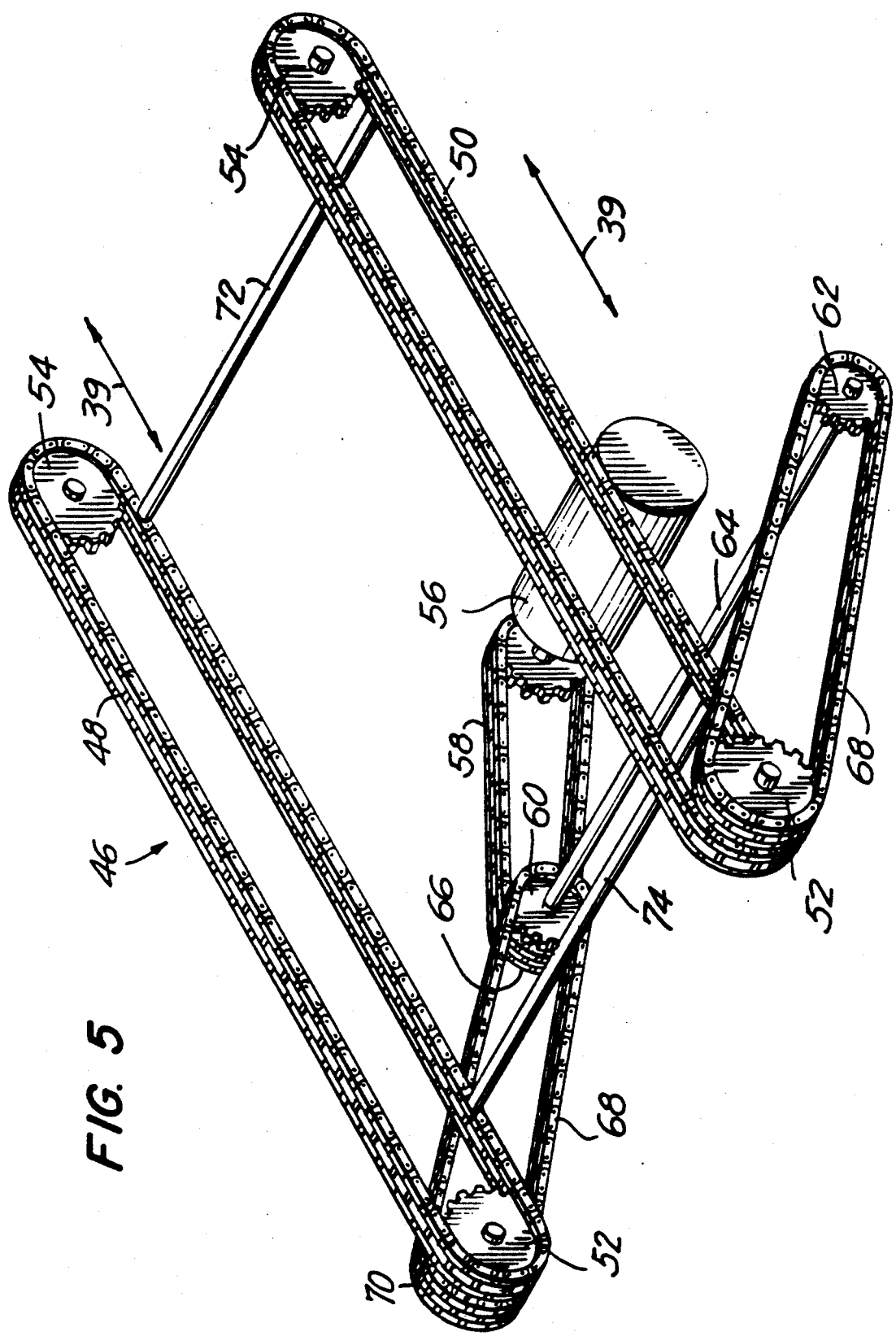
FIG. 5 is an elevated perspective view of the major operating components of the platform-carried extraction device of the present invention.

Also carried on the platform 28 is a tray extraction device 46, the main operating components of which are perhaps best seen in FIG. 5. The extraction device 46 is formed of a pair of continuous loop drive belts or chains 48, 50 or the like disposed proximate or along the opposite sides of and extending for generally the full length of the vertically-displaceable platform. The chains are spaced from each other, across the platform 28, by a distance substantially conforming to the width of the trays 80 and, in the preferred form herein disclosed, by slightly more than the tray width so as to enable supported receipt of a tray, extracted from one of the arrays, on the platform between the opposed chains 48, 50 as will hereinafter become apparent. Each chain is trained about spaced apart first and second rollers or sprocket wheels 52, 54 and lies in a substantially vertical plane with the upper run of the continuous chain loop above and the lower run of the loop below the tray-support shoulders 45. Selectively controlled rotation of the chains 48, 50 about the sprocket wheels 52, 54 is effected by operation of a bidirectional electric motor 56. The motor 56 drives the sprocket wheels 52 through the combination of a first belt or chain linkage 58 and associated intermediate sprocket rollers 60, 62 fixedly secured to a rotatable tie shaft 64, a transfer sprocket roller 66 concentrically rotatable with the roller 60, and second linkages 68 and associated driven sprocket rollers 70 each concentrically rotatable with a respective one of the sprocket wheels 52.

Carried on and spanningly between the drive chains 48, 50 are first and second tray engagement rods 72, 74. The elongated rods extend substantially perpendicular to the tray-extraction direction 39 and are suitably configured for releasable engagement with the handles—or more particularly for receipt within the channels 98— that are defined proximate the longitudinal ends of the trays 80. The rods 72, 74 are, moreover, predeterminately spaced from each other longitudinally along the chains 48, 50 by a distance substantially corresponding to the separation of the channels 98 at opposite ends of each tray. This spacing permits each of the rods 72, 74 to be received and concurrently maintained in a respective one of the channels 98 at the opposite ends of any selected tray 80. Where, as herein disclosed, the tray channels 98 have downwardly-directed openings through which the rods 72, 74 are receivable into the channels, the rod locations illustrated in FIG. 5—i.e. along the lower runs of the drive chains 48, 50—correspond to a state or condition in which neither rod 72, 74 is positioned within a tray channel 98 or, put another way, in which no tray 80 is either currently disposed supportedly on the platform 28 or is in the process of being extracted from an array shelf.

The platform 28 is additionally provided proximate each of its longitudinal ends—as for example on one of the brackets 100 to which the platform guide rollers 40 are rotatively mounted—with an upper and a lower sensor 102, 104 (FIG. 3) for assuring the achievement and maintenance of proper registration of the platform with a selected tray or with a vacant tray-receiving location in one of the arrays 12, 14. Any suitable sensor may be utilized for this purpose; in the presently disclosed embodiment of the invention, a reflective-type sensor (such as photomicrosensor EE-SY310 of the Omron Tateisi Electronics Co. of Osaka, Japan) is employed for each of the sensors 102, 104. These sensors cooperate with an extension or finger 106 (FIG. 4) that projects outwardly beyond the horizontal standard 18 from one of each pair of the shelf members 20 at its end proximate the access region 16. The finger 106 has a vertical height or size at least equal and preferably closely conforming to the spacing of the upper and lower sensors 102, 104 so that the sensors are capable of simultaneous alignment or opposed adjacency with the surface of the finger. In other words, vertical registration of the platform 28 with a filled or vacant tray-receiving location in one of the columnar arrays 12, 14 is indicated when both sensors 102, 104 simultaneously detect reflective proximity or adjacency with the corresponding shelf member finger 106, and is contraindicated when at least one of the sensors fails to detect such proximity. This arrangement enables—in addition to rapid and accurate determination of tray location registration as the platform is vertically displaced—continued maintenance of registration as a tray is extracted from an array and moved onto the platform, or is inserted into an array recess from the platform; the ability to maintain registration under such circumstances is particularly advantageous where an extracted tray contains an unusually heavy load which causes even minor stretching of the lift cable 30 (and consequent vertical movement of the platform 28) as a tray 80 is moved onto or off of the platform. The construction and details of a control device or circuitry for effecting dynamic realignment or reregistration of the platform and otherwise operating the lift motor 38 in accordance with, for example, the signals from the sensors 102, 104 is considered to be a matter of design choice to the person of ordinary skill.

The process by which the extraction device 46 operatively withdraws trays from, and correspondingly inserts trays into, locations defined in the columnar arrays 12, 14 will now be described. As previously noted, the FIG. 5 position of the rods 72, 74 corresponds to that condition in which no tray is currently supported on the platform 28 and the extraction device is in readiness for withdrawing a tray from a shelf in one of the arrays. The platform is first moved, if necessary, vertically along and between the arrays 12, 14 into registration with a selected tray 80 situated in a recess or location in, for example, the first array 12 by appropriate operation of the lift motor 38; proper vertical registration of the platform with the selected tray is detected by simultaneous reflective coincidence of both the upper sensor 102 and the lower sensor 104 with the shelf-carried finger 106 at the tray position. As seen in FIG. 4, the sprocket wheels 52, 54 are predeterminately located on the platform 28 so that, in this position of registration, the longitudinally outermost edge of each wheel 52, 54 is substantially vertically aligned with the elongation of the adjacently-disposed (i.e. leading end) tray channel 98. Thus, the innermost longitudinal end of each tray 80 that is properly seated on an opposed pair of shelf members or crossbars 20 projects into the access region by a distance sufficient to vertically align its innermost channel 98 with the longitudinal limit position of each drive chain run or loop 48, 50.

The next sequence of events in the withdrawal of the selected tray 80 is illustrated in pertinent part in FIGS. 6 through 8. The extraction motor 56 is operated in the appropriate rotational direction or sense to concurrently rotate the chains 48, 50 and jointly carry the rods 72, 74 along the lower chain runs toward the selected tray—i.e. to the right in the drawing Figures. As the first rod 72 reaches its rightward or forwardmost limit position at the second sprocket wheels 54 and is carried by the drive chains 48, 50 about the wheels 54, its direction of movement first shifts from a substantially horizontal to a substantially upwardly-vertical orientation. In so moving vertically upward the first rod 72 enters the channel 98, through its downwardly-directed access opening, and is thereby carried by the drive chains 48, 50 into engagement with the tray handle. The second rod 74, as the first rod moves vertically upward about the sprocket wheels 54, continues its forward or rightward horizontal motion along the lower chain runs.

With continued rotation of the drive chains in the same sense, the first rod 72 moves further about the outer circumference of the sprocket wheels 54 and shifts from a substantially vertical to a substantially horizontal direction of movement (FIG. 7), this time in the opposite or rearward direction—i.e. away from the array 12 bearing the selected tray—along the upper drive chain runs. As the first rod 72 thus moves horizontally away from the array 12 along the upper chain runs, it remains within the front or leading tray channel 98 and pulls the tray 80, through its abutment with the inner side or face of the tray lip 96, slidably along the shelf members 20. The selected tray is thereby withdrawn or extracted from the array shelf (i.e. to the left in FIGS. 4 and 7) and onto the support shoulders 45 of the platform 28. During this period of tray extraction, the second rod 74 continues to move horizontally toward the array 12 (from which the selected tray is being extracted) along the lower runs of the drive chains 48, 50.

As the selected tray 80 reaches a position of substantially complete withdrawal from support by the array shelf members 20, it attains a position in which the handle channel 98 at the rear or trailing end of the tray becomes vertically aligned with the outward edge of the sprocket wheels 54. This orientation occurs concurrently with the second rod 74 being carried by the drive chains 48, 50 along their lower runs, onto and circumferentially about the wheels 54, and thus vertically upwardly into the channel 98 at the trailing end of the tray. At this point, therefore, the rods 72, 74 are simultaneously located within the leading and trailing, respectively, channels 98 defined at the opposite longitudinal ends of the selected tray 80. Further continued rotation of the chains 48, 50 in an amount sufficient to carry both rods 72, 74 leftward (in the Figures) along the upper chain runs—to positions immediately above, for example, the lower run positions of the rods shown in FIG. 5—brings the entirety of the selected tray onto the platform shoulders 45 and clear of the array 11 and its associated structural and functional elements. The rods 72, 74— while the selected tray is thus supported on the platform 28—remain within the respective handle channels 98 at the tray ends (FIG. 8).

With the tray thus fully seated on the platform 28, the lift motor 38 may be operated to vertically displace the platform into registration with a vacant tray-receiving location in either of the columnar arrays 12, 14 or with the workstation 24 for enabling user access to the platform-carried tray. Where the tray is to be returned to a vacant recess or slot or shelf in the same array 12 from which it was extracted, operation of the motor 56 to rotate the drive chains 48, 50 in the opposite sense from that by which the selected tray was extracted will effect insertion of the platform-carried tray onto the array shelf. If, on the other hand, it is desired to insert or transfer the tray into the oppositely disposed array 14, the extraction device motor 56 is operated to rotate the chains 48, 50 in the same sense as that used to withdraw the tray from the first array 12. In either event, the joint movements of the rods 72, 74 and their cooperations with the selected tray end-mounted handles to, in effect, push or drive or so insert the tray into an array location or shelf should by now be apparent to those skilled in the art. What should be recognized and appreciated is that the extraction device of the present invention enables ready and reliable withdrawal and insertion of selected trays, from and into either of the confrontingly opposed columnar arrays, without undue structural complexity.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A storage and retrieval system comprising:
    a first plurality of storage compartments successively vertically stacked along a height direction to define a first column;
    a second plurality of storage compartments successively vertically stacked along said height direction to define a second column;
    said first and second columns being spaced apart in opposed relation to define an access region therebetween;
    at least one tray for storage in a storage compartment in either of said first or second columns, said tray having a first and second end spaced apart lengthwise along a longitudinal direction, and having opposite sides spaced apart widthwise along a width direction normal to said height and longitudinal directions;
    extraction means disposed in said access region for withdrawing a selected tray from its respective storage compartment in the longitudinal direction, and for inserting the selected tray in the longitudinal direction into a storage compartment in either of said first and second columns;
    means for vertically displacing said extraction means along said height direction;
    said tray having first engagement means at said first end thereof and second engagement means at said second end, said first and second engagement means for engagement with said extraction means; and
    said extraction means comprising:
    (i) platform means for supporting said selected tray after withdrawal from its respective storage compartment, said platform means having opposite ends spaced apart lengthwise along a longitudinal direction;
    (ii) first extractor rod means for engaging said engagement means at one of the ends of the selected tray;
    (iii) second extractor rod means for engaging said engagement means at an other end of the selected tray;
    (iv) first and second chain means spaced apart in the width direction for carrying said first and second extractor rod means, said first and second extractor rod means disposed longitudinally between said first and second chain means, each of said first and second chain means being trained about a respective pair of spaced apart rotatable gear means disposed proximate opposite ends of said platform means; and
    (v) drive means for simultaneously rotating said first and second chain means and for effecting movement of said first and second extractor rod means towards and away from said selected storage compartment, said rotation of said first and second chain means enabling said first extractor rod means to move vertically along the height direction into said first engagement means for force-transmitting engagement therewith, wherein further rotation of said first and second chain means effects movement of said selected tray longitudinally in a first direction away from its respective storage compartment and onto said platform means, said further rotation effecting concurrent movement of said second extractor rod means longitudinally in a second direction towards said respective storage compartment until said tray is substantially withdrawn from said storage compartment, whereupon continued rotation of said first and second chain means enables said second extractor rod means to move vertically along the height direction into said second engagement means, said second extractor rod means thereby positioned for engagement with said second engagement means, said drive means effecting further rotation of said first and second chain means for moving said selected tray in said first direction fully onto said platform means; and further wherein when said selected tray is disposed on said platform means, additional rotation of said first and second chain means enables further movement of said selected tray into registered insertion in any one of the storage compartment selectively located in either of said columns.

2. A storage and retrieval system according to claim 1, wherein said drive means further includes means for effecting bi-directional rotation of said first and second chain means.

3. A storage and retrieval system according to claim 2, wherein each of said first and second chain means lies in a substantially vertical plane.

4. A storage and retrieval system in accordance with claim 3 wherein each of said first and second engagement means comprises an elongated channel extending widthwise along opposite ends of said tray, said elongated channel having a vertically oriented opening.

5. A storage and retrieval system in accordance with claim 4, wherein when said tray is stored in its respective storage compartment, said elongated channel of said engagement means extends into said access region to permit a respective extractor rod means to enter into said channel along the height direction when retrieving a selected tray or disengage from said channel along the height direction when storing said selected tray.

6. A storage and retrieval system in accordance with claim 5, wherein said means for vertically displacing said extraction means along said height direction includes means for sensing proper registration of said platform means with a selected one of said storage compartments in said first or second columns to thereby enable withdrawal of a tray from and insertion of a tray into the selected storage compartment.

7. A storage and retrieval system in accordance with claim 6, wherein each of said storage compartments includes a shelf means for supporting a selected tray as said selected tray is longitudinally inserted into or retrieved from a selected storage compartment.

8. A storage and retrieval system in accordance with claim 7, wherein said sensing means comprises a registration member carried on an end of said shelf means proximate said access region, and an upper and lower sensor carried on said platform means for detecting coincidence of said sensors with said registration member of said shelf means to thereby indicate registration of said platform means with a selected storage compartment.

9. A storage and retrieval system in accordance with claim 8, wherein said registration member comprises an outward projection carried on said end of said shelf means.

10. A storage and retrieval system in accordance with claim 9, wherein said first and second columns are spaced apart by at least a tray length.

11. A storage and retrieval system in accordance with claim 10, wherein said first and second extractor means are longitudinally spaced apart a length corresponding to the length between said first and second ends of said tray.

12. A storage and retrieval system in accordance with claim 1, wherein said second extractor rod means engages said second engagement means to enable insertion of said selected tray into a storage compartment located in the column opposing the column in which said selected tray was originally located.

13. An automated, non-manual method for withdrawing a selected tray from a selected storage compartment, said selected storage compartment being located in either of two confrontingly-opposed columns defining an access region therebetween, each column thereof having a plurality of storage compartments vertically stacked along a height direction for storing trays, wherein each of said trays have a first and second end spaced apart lengthwise along a longitudinal direction, and have opposite sides spaced apart widthwise along a width direction normal to said height and longitudinal directions, and having a first engagement means at said first end of said selected tray said engagement means in proximity with and extending slightly into said access region and a second engagement means at said second end of said selected tray, said method comprising the steps of:

(a) moving an extraction means along the height direction in said access region, said extraction means including a platform and a first and second chain means spaced apart in the width direction for carrying a first and second extractor rod, said first and second extractor rods being longitudinally disposed between said first and second chain means for engaging said respective first and second engagement means of said selected tray, said first and second extractor rods being elongated along said width direction;

(b) registering said platform means adjacent to a storage compartment having said selected tray stored therein;

(c) simultaneously rotating said first and second chain means to concurrently move said first and second extractor rods toward the selected tray location to a position whereby the first extractor rod is located substantially vertically-adjacent said first engagement means then further rotating said first and second chain means to thereby move said first extractor rod vertically along the height direction until said first extractor rod is in force-transmitting engagement with said first engagement means along the width direction;

(d) moving said first extractor rod, in continuous engagement with said first engagement means at said first end of said selected tray, away from the selected storage compartment and onto said platform until said tray is substantially withdrawn from said storage compartment while said second extractor rod is concurrently moved further toward said selected tray location to a position whereby said second extractor rod is located substantially vertically-adjacent said second engagement means at said second end of said selected tray;

(e) moving said second extractor rod substantially vertically along the height direction into said second engagement means while said first extractor rod, in continued engagement with said first engagement means, is moved further away from the storage compartment so that said first extractor rod is in engagement with said first engagement means and said second extractor rod is concurrently disposed in said second engagement means, wherein said selected tray is in supported relation on said platform;

(f) further rotating said first and second chain means to enable further movement of said first and second extractor rods away from the selected storage compartment to a position in which the selected tray is completely withdrawn from said column and is carried on said platform with said first extractor rod disposed in engagement with said first engagement means and said second extractor rod disposed in said second engagement means of said selected tray;

(g) further rotating said first and second chain means to enable further movement of said selected tray toward another storage compartment located in the column opposite to the column from where said selected tray was withdrawn, said selected tray carried on said platform with said first extractor rod disposed in engagement with said first engagement means and said second extractor rod disposed in said second engagement means of said selected tray;

(h) further rotating said first and second chain means until said selected tray is registered for insertion in said another storage compartment;

(i) vertically disengaging said first extractor rod from said first engagement means along the height direction while concurrently positioning said second extractor rod into force-transmitting engagement with said second engagement means along said width direction; and (j) additionally rotating said first and second chain means to continue movement of said selected tray, until said selected tray is substantially inserted into said respective storage compartment.

14. An automated, non-manual method in accordance with claim 13, further including after step (j) a step of further rotating said first and second chain means until said second extractor rod vertically disengages from said second engagement means.

15. An automated, non-manual metal in accordance with claim 14, further comprising after step (f) and prior to step (g) a step of moving said extraction means vertically in said access region to register said platform, carrying said selected tray, adjacent to said another storage compartment.

16. An automated, non-manual method in accordance with claim 15, wherein each of said first and second engagement means comprises an elongated channel extending widthwise along opposite ends of said tray, said elongated channel having a vertically oriented opening wherein when said tray is stored in its respective storage compartment, said elongated channel extends into said access region, said method further including a step of moving a respective extractor rod into said channel along the height direction when retrieving a selected tray or, alternatively, disengaging a respective extractor rod from said channel along the height direction when storing said selected tray in a respective storage compartment.

* * * * *